United States Patent [19]

Rhodes

[11] Patent Number: 4,605,154

[45] Date of Patent: Aug. 12, 1986

[54] RADIATOR HEATER SOLDER POURING PROCESS

[75] Inventor: Wayne A. Rhodes, Larray, Tenn.

[73] Assignee: Johnstone Railway Supply Mfg., Co. Inc., Kenton, Tenn.

[21] Appl. No.: 695,391

[22] Filed: Jan. 28, 1985

[51] Int. Cl.$^4$ ............... B23K 31/02; B21D 53/02; B23P 15/26

[52] U.S. Cl. ................... 228/102; 228/183; 228/187; 228/200; 228/226; 228/257; 228/9; 228/37; 228/47; 29/157.3 R; 29/157.3 C

[58] Field of Search .............. 228/183, 257, 200, 102, 228/9, 219, 103, 187, 226; 29/157.3 C, 157.3 R, 157.4

[56] References Cited

U.S. PATENT DOCUMENTS

| | | | |
|---|---|---|---|
| 454,618 | 6/1891 | Gaiger | 228/257 |
| 2,313,315 | 3/1943 | Blair | 228/183 |
| 2,417,662 | 3/1947 | Rosales | 228/200 |
| 2,489,888 | 11/1949 | Huber | 228/200 |
| 4,157,155 | 6/1979 | Smith | 228/183 |

FOREIGN PATENT DOCUMENTS

| | | | |
|---|---|---|---|
| 2149 | 1/1980 | Japan | 228/183 |
| 620356 | 7/1978 | U.S.S.R. | 228/183 |

Primary Examiner—Nicholas P. Godici
Assistant Examiner—Samuel M. Heinrich
Attorney, Agent, or Firm—Head, Johnson & Stevenson

[57] ABSTRACT

This is a process relating to improvements in the soldering of headers to conventional radiators. Tubular members of the radiator extend through holes in the header. The tubes are initially sealed to the header with a solder having a high temperature melting point $T_1$. Infrared heat heats the header to a temperature $T_2$ which is less than $T_1$ but above a lower temperature $T_3$ which is the melting temperature of a second solder. Upon the header reaching a selected temperature $T_2$, a selected amount of the second solder in a molten state is poured in the header to puddle the entire pan area of the header, and allowed to cool to form a very strong soldered connection.

10 Claims, 4 Drawing Figures

RADIATOR HEATER SOLDER POURING PROCESS

BACKGROUND OF THE INVENTION

This invention relates to a system for forming a joint, particularly between tubular members of a radiator core and the header having holes through which the tubular members extend to obtain a core unit. The core unit includes a header. Typically, the tubular members are made of solder coated brass and the material of the header is brass. The header has sides which extend above the plane through which the holes are and thus, forms a header pan. The header to be soldered to the tubes is first positioned in a level, horizontal plane. In this first step, the header and tubes to be soldered are fluxed with a zinc chloride flux to clean the mating parts and to remove the outside film from the base metal. The header is then heated normally with a gas torch by a skilled operator and solder wire is fed into the joints around the tubular members which are to be bonded. Typically, a "97 solder" is used which is about 1% tin, 97.2% lead and 1.5% silver and has a melting point of about 588° F. There are various ways of applying this 97 solder. One way is that just described and another way is to dip the tubes extending through the header into a molten bath of "97 solder" and then lift it out and at the same time, blowing air downwardly through the tubular members to remove any molten solder from within those tubular members. The solder rapidly cools and forms an initial seal.

Next it is desired to obtain a second sealing which can be accomplished by the so-called puddling operation in which two torches are used by the operator to melt "40/60 solder" strips which have been placed on the header in the spaces between the tubes which extend up through the header. A composition 40/60 solder is composed of about 40% tin and 60% lead. The header is then heated with a torch by a skilled operator to melt and blow the solder to puddle the entire pan area of the header to a depth of approximately 5/16 inches deep. This operation is most critical in this procedure. Too much heat, too long in one area, will cause the 97 solder to melt and flow out of the joint area. If "30/70 solder" having a melting point of about 491° F. is used in the seams of the tubular members, then it too may melt. When soldering gets too hot, it will run out of the lock and seam joints. This leaves a potential leak problem. Also, during the "97" soldering operation, every tube must have a complete seal and bond around every tube. This insures that no 40/60 will pour through into the fin area. On the other hand, too little heat will cause a pasty condition, resulting in a porous cold solder area, with possible air passages through the puddle layer, resulting in poor strength and leaks with possible entrapment of flux. It should be noted that to obtain maximum strength of the solder involved, the flux must be present and active. The extreme heat of the torches require use of corrosive fluxes, consisting of inorganic gases and salts, which do not char or burn off. These salts remain corrosive after soldering. Complete removal of these salts is necessary to assure that no subsequent corrosion from these salts can take place. The success of this type of solder bonding procedure relys mainly on the ability of the personnel involved.

It is an object of this invention to remove the two main problems in the soldering system just described above. More specifically, an object is to remove the high heat source of the torch which may reach 2000° F. It is a still more specific object of the invention to provide a system which removes or reduces the possible error due to personnel judgment.

SUMMARY OF THE INVENTION

This is a new system for soldering tubular members of a cooling radiator which are inserted through holes in a top and a bottom header. An initial soldering step is used in which the tubes are soldered to the header by use of a solder having a melting point of $T_1$ which typically may be 588° F. Thereafter, the assembled radiator is held in an upright position so that the header, with the tubes protruding upwardly from it, form a pan-like structure called a header pan. The second soldering is performed by heating the header to a temperature $T_2$ which is less than $T_1$ but above a lower temperature $T_3$ of a second solder which is to be used in the second soldering operation. This second solder may typically have a melting point of 475° F. When the header reaches temperature $T_2$, a selected amount of the second solder, which is in the molten stage, is poured into the header pan. This pouring of the molten solder is continued until a desired level is reached in the header pan. Care must be exercised so that the tubes do not get too hot and thus melt the first solder. I accomplish this by blowing air upwardly through the tubes.

The header is then allowed to cool so that the second solder can solidify. Thereafter, the radiator unit is turned upside down and the other end having the other header and the other end of the tubular members are then likewise sealed with the first and second soldering material.

In a preferred embodiment, I maintain a solder pour pot which holds the second solder at a selected temperature so that it is in a molten condition. I then use an infrared heater that heats the header. An instrument senses the temperature of the heated header and when it reaches a predetermined temperature, e.g., $T_2$, solder from the solder pour pot is poured into the header. In another improvement, another instrument senses the level of the molten liquid solder in the header pan and when it reaches a predetermined level, the pouring of molten solder into the header pan is stopped. In this improvement, I also provide that when the temperature reaches a selected level on the header pan, air is blown upwardly in the tubular members.

Various additional objects and a better understanding of the invention can be had from the following description taken in conjunction with the drawings.

DETAILED DESCRIPTION OF THE PREFERRED EMBODIMENT

Figure 2:
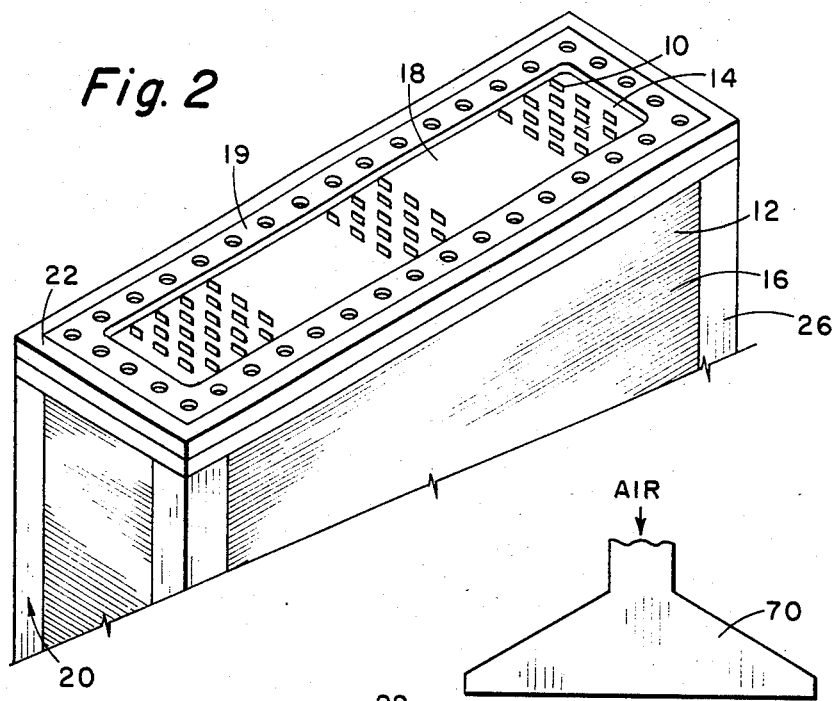
FIG. 2 illustrates the top portion of the radiator showing the header pan area.
Figure 1:
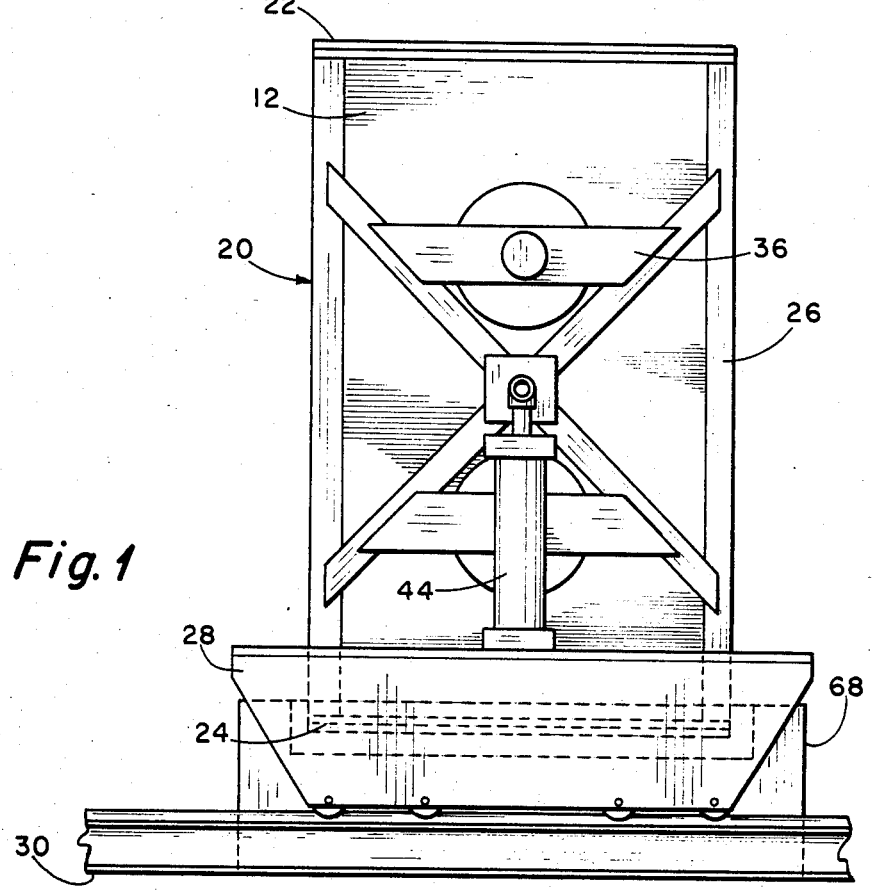
FIG. 1 is a side view of a radiator held in a radiator holding clamping frame.

Attention is first directed to FIGS. 1 and 2 which shows the preferred apparatus for holding the radiator in the proper position. It also shows a solder dip pot used in performing a first step of soldering. Cooling tubes such as cooling tubes 10 of radiator 12 are to be soldered to header 14. At this point, it will be assumed that the header has been assembled with the radiator core including cooling vanes 16 and the cooling tubes 10. A header 14 has been pushed on each end of the core and one of those is shown in FIG. 2. The cooling tubes 10 extend up through the flat area or base 18 of the header through holes which have previously been made. It is necessary to solder these cooling tubes to the floor 18 of the pan of the header. Typically, the first solder used is what they call a "97 solder" and its composition by weight is approximately 1% tin, 97.2% lead and 1.5% silver. It has a melting temperature of 588° F.

Figure 4:
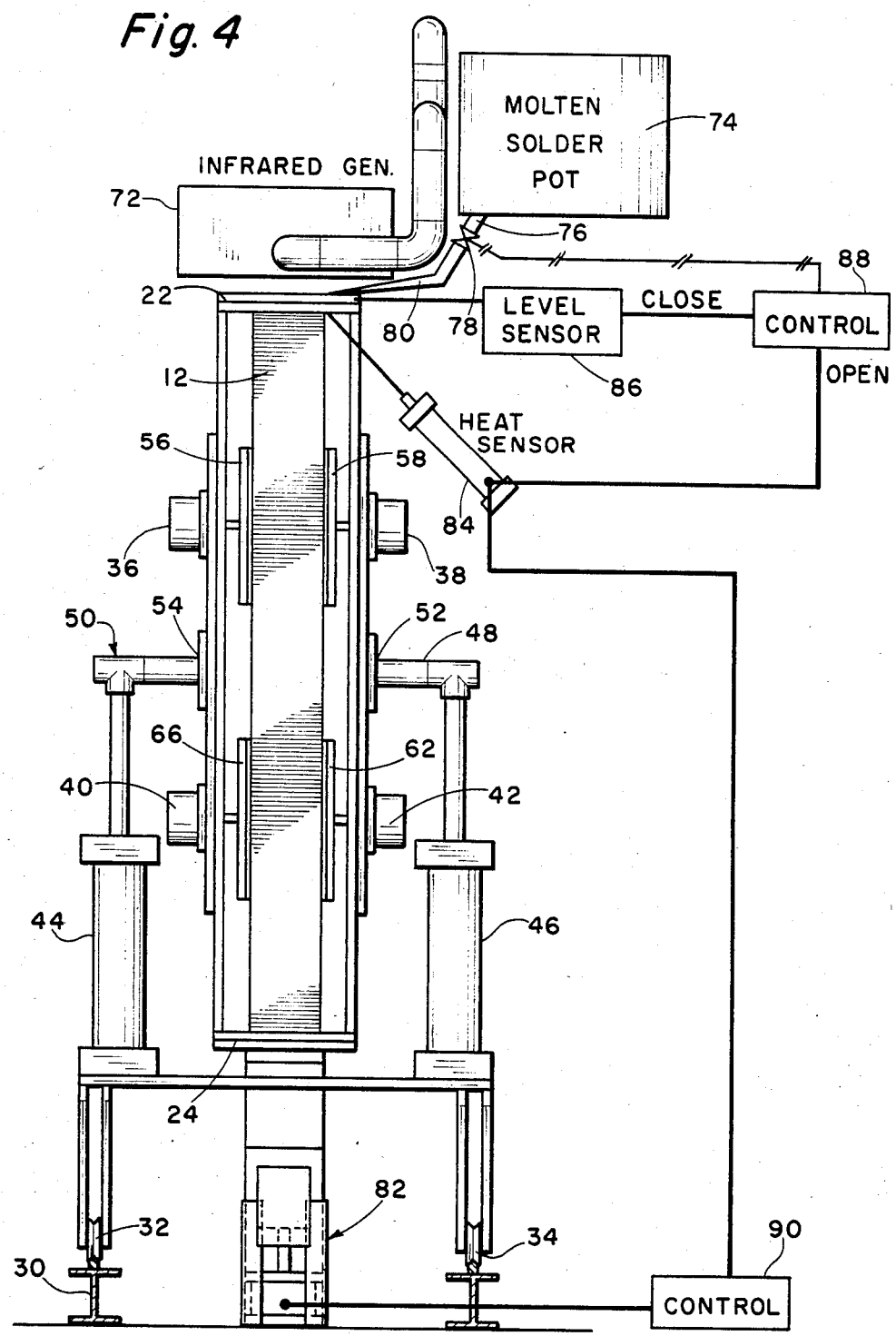
FIG. 4 is an edge view of the radiator being processed and includes control means for soldering the tubes to the header.

A preferred way of soldering the cooling tubes 10 to the header pan floor 18 with the first solder is illustrated in FIG. 1. Shown thereon is a radiator 12 which has been placed in a new radiator holding and clamping frame 20 which has a top 22 and a bottom 24 which are connected by a plurality of upright members 26 at the corners of the top 22 and bottom 24. Frame 20 is mounted in any known manner from movable carriage 28 which is supported from carriage track 30 as shown in FIG. 4 by wheels 32 and 34. There is provided a lifting device for the frame which may consist of first hydraulic cylinder 44 and a second hydraulic cylinder 46 as also shown in FIG. 4. The connecting rods from cylinders 44 and 46 are connected through horizontal members 48 and 50 to pivot 52 and 54 respectively. The purpose of the pivots 52 and 54 is to permit the frame 20 to be rotated so that the top and bottom of the radiator can be reversed.

The bulk of the weight of the radiator is held by the top and bottom 22 and 24 of the frame 20. However, clamping cylinders 36, 38, 40 and 42 are connected to discs 56, 58, 60 and 62 for giving lateral stability to the radiator 12.

Attention is now directed to FIG. 1 to show the preferred manner of obtaining the initial soldering step for soldering the cooling tubes 10 to the header pan floor 18. A solder dip pot 68 has been provided at a first or dip solder station between the rails of carriage track 30. This can be called a "97" dip pot because in a preferred operation it contains the aforementioned "97" solder in a molten condition. The header and cooling tubes are lowered at ambient temperature into the solder dip pot for a short period of time which permits the solder to enter any holes or space between the cooling tubes and the walls of the header. This typically takes about five minutes. As soon as this occurs, the lift 44 is energized or activated and raises the radiator holding clamping frame 20 and the radiator 12 until it is clear of the solder dip pot 68. At this point in the procedure, a compressed air hood 70 is immediately above the radiator 12. Then air is directed down through the hook 70 through the cooling tubes 10 to blow any solder out the lower ends of such tubes before it has an opportunity to harden. The movable carriage 28 is placed in a position where frame 20 can be rotated from top to bottom and then the process of soldering the other end of the header system is carried out just as described above.

The molten solder is thermostatically controlled to the right temperature. The dip soldering eliminates possible voids in the joints. The header has a flange 19 and care is exercised so that the flange 19 does not come into contact with the molten solder. This can be accomplished in any known manner such as by using a masking tray which floats on top of the molten solder. Therefore, the molten solder stays within the pan area of the header and does not contact the flange. The mask would be essentially the same shape and size as the shape of flange 19 so that flange 19 can fit into the masking tray. As the core is lowered, the masking tray displaces solder by raising solder to the mask area and contacting the joints between the tubular members 10 and the header pan 18.

Figure 3:
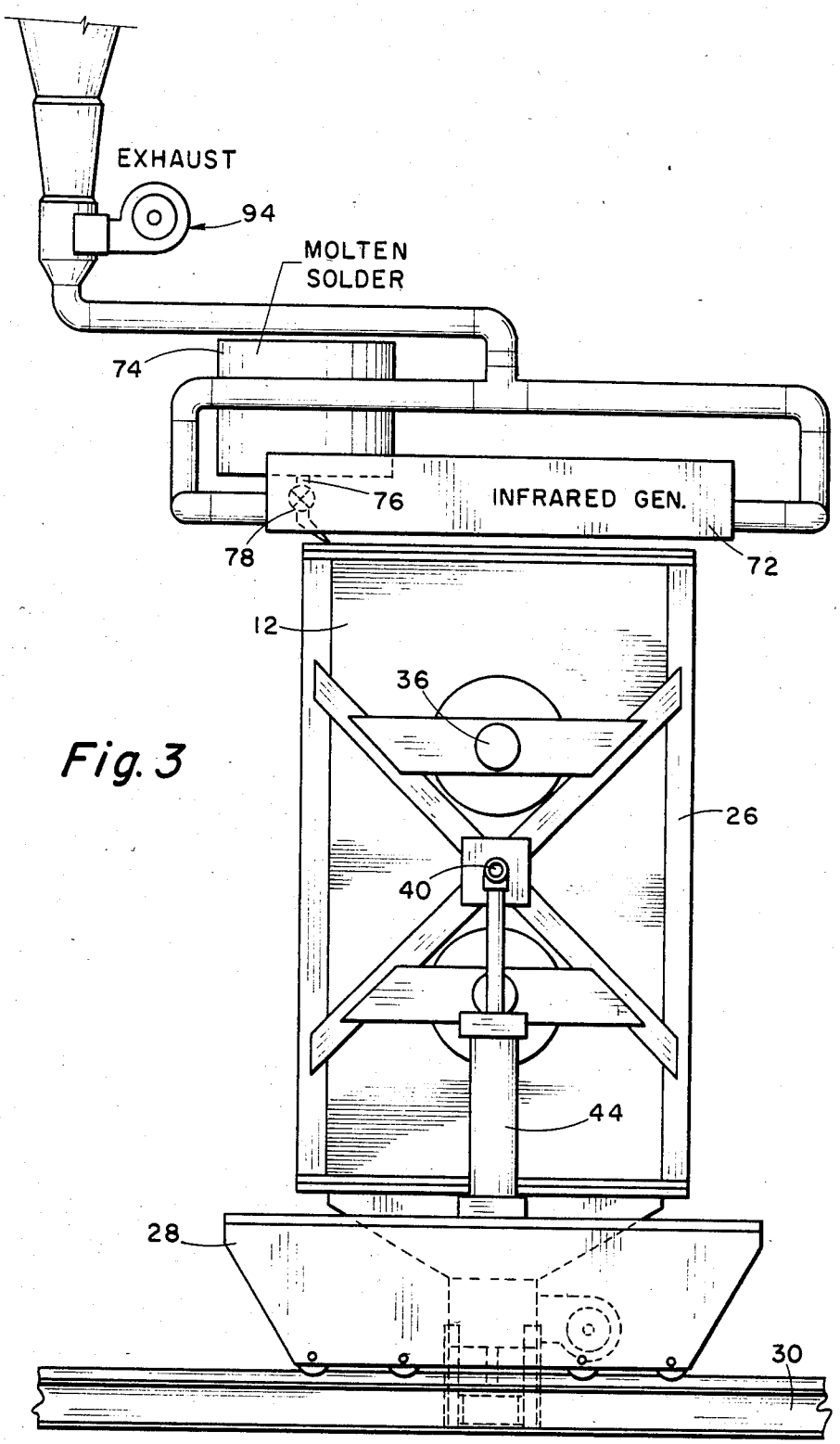
FIG. 3 is a front view of a radiator and means for soldering the tubes to the header.

After the "97" operation on both ends of the core, the movable carriage 28 moves along rails 30 to a second or solder pouring station at the position shown in FIGS. 3 and 4 which shows my new method of applying the second solder which includes my novel way for applying the soldering pouring step. With the radiator in the position shown in FIGS. 3 and 4, I heat the top header to a temperature which is less than the temperature of 588° F. required to melt the "97" solder but at least to the melting temperature of the second solder which I am now going to apply. Typically, the second solder can be a 40/60 solder which is 40% tin, 60% lead and melts at about 475° F. I obtain this temperature by the use of the infrared generator 72 which is positioned just above the top of the header of radiator 12. I provide a molten solder pot 74 having an outlet 76 and a control valve 78 and a chute 80 for directing molten solder onto the header. The outlet 76, control valve 78 and chute 80 are all heated to prevent the solder from solidifying. The valve is as close to the header pan as possible to keep the flow rate of the molten solder to an acceptable low level and also avoid splashing. A solder pot can be any well known mechanism which will keep my 40/60 solder in a molten condition. I detect when the header reaches the temperature $T_2$ which is less than $T_1$, temperature of the melting point of 588° F. of the "97" solder but above the lower temperature $T_3$ of a second solder which is to be used in the second soldering operation, which, in this preferred case, is 40/60 which has a melting point of 475° F. When the temperature in the header reaches the temperature $T_2$, I pour a selected amount of the second solder 40/60 from molten solder pot 74 into the header pan and I continue pouring until a desired level is reached which typically may be 5/16". Care must be exercised so that the tubes 10 do not get too hot and thus melt the first solder or the solder of the tubes if seam tubing is used. I accomplish this by blowing air upwardly from blower 82. Once the header is covered with the molten solder, it will reflect most of the heat from the infrared heater.

The heater is then allowed to cool so that the second solder can solidify. Thereafter, the radiator unit is turned upside down and the other end having the other header and the other end of the tubular members are then likewise sealed with the first and second soldering material as described above.

Also shown in FIG. 4 are means to obtain, by use of instruments, the opening and closing of the solder pot valve 78. This includes a heat, sensor 84 and a level sensor 86 which are used respectively to detect the heat of the header and the level of the molten liquid in the header pan. The direct contact method of determining the temperature of the header using a thermocouple is probably preferred although an infrared heat sensor may be acceptable. One heat sensor which I have used is commercially available from Raytek and is identified as their Thermalert II. A liquid level sensor which I have used is available from PSI. IND., INC., Memphis, Tenn., and is identified as Model No. 246-1 Amplifier. When the heat sensor senses the temperature $T_2$ it does two things, (1) it sends a signal to control 88 which opens valve 78, and (2) it sends a signal to control 90 which starts blower 82 to blow air up to the tubes. When valve 78 is opened, molten solder 40/60 flows into the header pan 18 until it reaches a pre-selected level which is detected by the level sensor 86. This sends out a "close" signal to control 88 which then closes valve 78.

A suitable infrared generator is commercially available from Marsden Manufacturing Co., DeLran, N.J.

It is believed that a comparison of the old process and my new process should be discussed. The older method relies on direct heating by hand-held torches in which the torches are 1800° F. to 2000° F. which can actually burn off the solder on the tube ends, therefore, destroying the tightness of the lock seam joint. Overheating the solder can also cause separation of the alloys contained in the solders. This leaves a slag deposit that is difficult to bond, therefore, weakening the bond structure. My new process eliminates the need for these hand held torches, therefore, eliminating the associated problems connected with them. This allows all impurities, air passages and fluxes to float to the top of the solder pot. This leaves a solder puddle layer that is superior to what can be obtained in the old process. It is believed that the infrared radiation makes this possible. By using infrared, all of the component temperatures can be precisely controlled eliminating the problem or possibility of overheating. With this infrared heating method there is no vibration which may weaken joints such as if ultra-simi systems are used.

Infrared heating instead of torches also allows argon gas to be used as an inert blanket over the liquid 40/60 solder to inhibit oxidation of the solder. This gas can be introduced into the solder pour tube 76 in FIG. 4.

While this invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of soldering tubular members of a cooling radiator which are inserted through holes in a top and bottom header comprising:
   (a) sealing the space between said tubes and the wall of said holes with a high temperature solder melting at the temperature $T_1$;
   (b) using infrared heat to heat one of said headers to a temperature $T_2$ which is less than $T_1$ but above a lower melting point temperature $T_3$ of a second solder;
   (c) upon said one header reaching the temperature $T_2$ pouring a selected amount of said second solder in a molten stage in said header and blowing a cooling medium through said tubular members.

2. A method as defined in claim 1 in which said first solder is a "97" solder which is about 1% tin, 97.2% lead and 1.5% silver and has a melting temperature of about 588° F. and said second solder is 40/60 which is about 40% tin and 60% lead and has a melting temperature of approximately 475° F.

3. A method as defined in claim 1 including repeating steps (a), (b) and (c) for the other header.

4. A method as defined in claim 1 in which step (a) includes having one of said headers facing downwardly and the dipping of said one header into a pot of molten solder, raising said header and blowing air through said tubular members.

5. A method as defined in claim 1 including the step of placing an inert gas blanket over the liquid second solder in the pan of said header.

6. An apparatus for soldering tubular members of a cooling radiator which are inserted through holes in a top and bottom header which comprises:
   a frame for holding said cooling radiator in an upright position and including pivotal supports so that said radiator can have the position of the top and bottom headers reversed;
   a carriage means for supporting said frame so that said frame is movable from location to another;
   means supported by said carriage means for raising and lowering said frame;
   an infrared generator for directing the head downwardly toward one of said headers when said radiator is positioned under said generator;
   a molten solder pot for heating and holding molten solder;
   a discharge line from said solder pot to said header;
   a valve in said line;
   a heat sensor means to sense the heat of said header;
   a level sensor to detect the level of the molten solder in said header;
   a control means responsive to said heat sensor to open said control valve when the header reaches a preselected temperature and to close said valve when the level of the molten solder on said header reaches a preselected level;
   a blower positioned below the lower end of said cooling radiator when positioned under said infrared generator for blowing air upwardly through the tubular members;
   a second control means responsive to said heat sensor for causing said blower to blow air through said tubular members.

7. An apparatus as defined in claim 6 in which said carriage means is mounted on rails and including a liquid solder bath positioned between said rails such that said carriage can be moved so that said cooling radiator is directly above said molten bath.

8. An apparatus for soldering tubular members of a cooling radiator which are inserted through holes in a top and bottom header, said header having a pan and which comprises:
   frame means for holding said radiator in an upright position with said header in a horizontal position;
   heating means to heat said header to a selected temperature;
   a solder pot for holding molten solder which has a melting temperature less than said selected temperature and supported by said frame means at a position at a higher level than said header and including valve means for permitting the flowing of liquid solder onto the pan of said header;
   means to sense the temperature of said header and to open said valve means when said header reaches said selected temperature;
   means to blow a cooling medium through said tubular members.

9. An apparatus as defined in claim 8 in which said heating means is an infrared heater.

10. An apparatus as defined in claim 8 including lifting means to raise and lower said frame means.

* * * * *

UNITED STATES PATENT AND TRADEMARK OFFICE
CERTIFICATE OF CORRECTION

PATENT NO. : 4,605,154
DATED : Aug. 12, 1986
INVENTOR(S) : Rhodes

It is certified that error appears in the above-identified patent and that said Letters Patent is hereby corrected as shown below:

On the title page, in item [54] and column 1, line 2, in the title "Heater" should be --Header--;

in item [73], change "Johnstone" to --Touchstone-- and change "Kenton" to --Jackson--.

Signed and Sealed this

Eleventh Day of December, 1990

Attest:

HARRY F. MANBECK, JR.

*Attesting Officer*     *Commissioner of Patents and Trademarks*